(12) United States Patent
Liu et al.

(10) Patent No.: US 11,650,453 B2
(45) Date of Patent: May 16, 2023

(54) DISPLAY PANEL THAT RESOLVES DIFFERENCES IN THE DISPLAYED IMAGE DUE TO INCONSISTENCY BETWEEN SIZE OF THE LIGHT TRANSMITTING PIXELS AND A SIZE OF THE CONVENTIONAL PRIOR ART PIXELS THAT AFFECTS DISPLAY EFFECT

(71) Applicant: WUHAN CHINA STAR OPTOELECTRONICS TECHNOLOGY CO., LTD, Wuhan (CN)

(72) Inventors: Fancheng Liu, Wuhan (CN); Guowei Zha, Wuhan (CN)

(*) Notice: Subject to any disclaimer, the term of this patent is extended or adjusted under 35 U.S.C. 154(b) by 472 days.

(21) Appl. No.: 16/970,362

(22) PCT Filed: Jun. 23, 2020

(86) PCT No.: PCT/CN2020/097700
§ 371 (c)(1),
(2) Date: Aug. 16, 2020

(87) PCT Pub. No.: WO2021/248559
PCT Pub. Date: Dec. 16, 2021

(65) Prior Publication Data
US 2023/0087559 A1 Mar. 23, 2023

(30) Foreign Application Priority Data
Jun. 11, 2020 (CN) .......................... 202010527293.4

(51) Int. Cl.
*G02F 1/1343* (2006.01)
*G02F 1/1333* (2006.01)
*G02F 1/13357* (2006.01)

(52) U.S. Cl.
CPC .............................. *G02F 1/133603* (2013.01)

(58) Field of Classification Search
CPC .................................................. G02F 1/133603
See application file for complete search history.

(56) References Cited

U.S. PATENT DOCUMENTS

| | | | |
|---|---|---|---|
| 2016/0131825 A1* | 5/2016 | Harrold | H01L 25/00 362/249.14 |
| 2016/0154263 A1* | 6/2016 | Hatsu | H01L 29/7869 349/12 |

(Continued)

FOREIGN PATENT DOCUMENTS

| | | |
|---|---|---|
| CN | 208271472 U | 12/2018 |
| CN | 110148374 A | 8/2019 |

(Continued)

OTHER PUBLICATIONS

Translation_ISRO_12-2021.pdf (Year: 2021).*

*Primary Examiner* — Tracie Y Green

(57) ABSTRACT

The present invention provides a display panel including a liquid crystal display layer and a light-transmitting display layer. The light-transmitting display layer includes a first pixel, and the liquid crystal display layer includes a second pixel. A size of the first pixels close to the liquid crystal display layer is less than a size of the first pixels away from the liquid crystal display layer, and/or a size of the second pixels away from the light-transmitting display layer is less than a size of the second pixels close to the light-transmitting display layer.

10 Claims, 4 Drawing Sheets

(56) References Cited

U.S. PATENT DOCUMENTS

| | | | |
|---|---|---|---|
| 2018/0059448 A1 | 3/2018 | Wang et al. | |
| 2020/0135972 A1 | 4/2020 | Ma et al. | |
| 2020/0279895 A1 | 9/2020 | Kuo et al. | |
| 2021/0072594 A1* | 3/2021 | Zhang | G02F 1/133603 |
| 2021/0407440 A1* | 12/2021 | Liu | G02F 1/133603 |
| 2022/0140041 A1* | 5/2022 | Lee | H01L 27/3246 |
| | | | 257/40 |
| 2022/0197074 A1* | 6/2022 | Yin | G02F 1/13338 |

FOREIGN PATENT DOCUMENTS

| | | |
|---|---|---|
| CN | 110491909 A | 11/2019 |
| CN | 110518037 A | 11/2019 |
| CN | 110703510 A | 1/2020 |
| CN | 110767694 A | 2/2020 |
| CN | 110782807 A | 2/2020 |
| CN | 110928069 A | 3/2020 |
| CN | 111176018 A | 5/2020 |

* cited by examiner

DISPLAY PANEL THAT RESOLVES DIFFERENCES IN THE DISPLAYED IMAGE DUE TO INCONSISTENCY BETWEEN SIZE OF THE LIGHT TRANSMITTING PIXELS AND A SIZE OF THE CONVENTIONAL PRIOR ART PIXELS THAT AFFECTS DISPLAY EFFECT

FIELD OF INVENTION

The present disclosure relates to the field of display technology, and more particularly, to a display panel.

BACKGROUND OF INVENTION

Smart terminals such as mobile phones and tablet computers have become increasingly indispensable in people's daily lives due to a combination of convenience, entertainment, and functional diversity. With continuous development of display technology, application of more and more advanced technologies on the smart terminals has greatly enriched people's lives. But at the same time, people's requirements and expectations for smart terminals are also increasing. While enjoying basic functions brought by the smart terminals such as the mobile phones and the tablet computers, people also have higher requirements for the smart terminals, such as full screen design of the smart terminals.

Full screen technology is a relatively broad definition of ultra-high screen ratio mobile phone design in display industry. A literal interpretation is that an entire front of the mobile phones is a screen, a display interface of the mobile phones is completely covered by the screen, and four border positions of the mobile phones are designed without borders to pursue an ultra-high screen ratio close to 100%. However, it is limited by other basic functional requirements that are indispensable to mobile phones such as front cameras, earpieces, distance sensors, and light sensors. At present, for a comprehensive screen design scheme that takes into account display at an under-screen camera, splicing display technology has emerged, and uses organic light-emitting diode (OLED) display technology in which light transmission is required for under-screen devices. OLED display technology has natural advantages over liquid crystal display (LCD) technology, but OLED is also limited by its pixel structure, and its pixels cannot be high-definition, so it will affect entire transmittance of a light-transmitting position, and ultimately affect imaging quality of the under-screen devices.

SUMMARY OF INVENTION

A purpose of the present disclosure is to provide a display panel, which also solves a difference in display images caused by an inconsistency between a size of light-transmitting display pixels and a size of conventional display pixel in the prior art that affects display effect.

In order to realize the above purpose, the present disclosure provides a display panel, the display panel comprises a liquid crystal display layer and a light-transmitting display layer. The liquid crystal display layer comprises a light-transmitting hole. The light-transmitting display layer is disposed in the light-transmitting hole.

Wherein, a plurality of first pixels are distributed in the light-transmitting display layer, and a plurality of second pixels are distributed in the liquid crystal display layer. A size of the first pixels close to the liquid crystal display layer is less than a size of the first pixels away from the liquid crystal display layer, and/or a size of the second pixels away from the light-transmitting display layer is less than a size of the second pixels close to the light-transmitting display layer.

Furthermore, when the size of the first pixels close to the liquid crystal display layer is less than the size of the first pixels away from the liquid crystal display layer, the light-transmitting display layer comprises a first conventional region and a first transition region surrounding the first conventional region.

The first pixels comprise a first conventional pixel and a first transition pixel. The first conventional pixel is disposed in the first conventional region. The first transition pixel is disposed in the first transition region, wherein a size of the first transition pixel is less than a size of the first conventional pixel.

Furthermore, the light-transmitting display layer further comprises at least one second transition region located between the first transition pixel and the first conventional region. The first pixel further comprises a second transition pixel, and the second transition pixel is disposed in the second transition region, wherein a size of the second transition pixel is greater than the size of the first transition pixel and less than the size of the first conventional pixel.

Furthermore, when the size of the second pixels away from the light-transmitting display layer is less than the size of the second pixels close to the light-transmitting display layer, the liquid crystal display layer comprises a third transition region and a second conventional region surrounding the third transition region.

The second pixels comprise a second conventional pixel and a third transition pixel. The second conventional is disposed in the second conventional region. The third transition pixel is disposed in the third transition region, wherein a size of the third transition pixel is greater than a size of the second conventional pixel and equal to the size of the first pixels.

Furthermore, the liquid crystal display layer further comprises at least one fourth transition region located between the third transition region and the second conventional region. The second pixel further comprises a fourth transition pixel, and the fourth transition pixel is disposed in the fourth transition region, wherein a size of the fourth transition pixel is greater than the size of the second conventional pixel and less than the size of the third transition pixel.

Furthermore, the light-transmitting display layer comprises a body portion and an extending portion surrounding the body portion, and the extending portion extends from the light-transmitting hole into the liquid crystal display layer. In the extending portion, the size of the first pixels is equal to the size of the second pixels.

Furthermore, the first pixels comprise first red pixels, first green pixels, and first blue pixels that are sequentially arranged in the light-transmitting display layer. The second pixels comprise second red pixels, second green pixels, and second blue pixels that are sequentially arranged in the liquid crystal display layer. Wherein, in the extending portion, the first red pixel corresponds to the second red pixel, the first green pixel corresponds to the second green pixel, and the first blue pixel corresponds to the second blue pixel.

Furthermore, the display panel comprises a supporting layer disposed on the light-transmitting display layer.

Furthermore, each of the first pixels comprises a light-emitting region and a light-transmitting region connected to the light-emitting region. The light-emitting region comprises at least one micro light-emitting diode (micro-LED) chip Furthermore, the micro-LED chip is one of a single-color chip or a tri-color chip.

Advantages of the present disclosure are that the display panel of the present disclosure gradually decreases or increases the pixel size at a junction of the light-transmitting display layer and the liquid crystal display layer, so that the pixel size at the junction of the light-transmitting display layer and the liquid crystal display layer is naturally transitioned, which relieves a difference in images caused by the inconsistent pixel size, and improves display effect of full screen. Moreover, it is also conducive to splicing of the liquid crystal display layer and the light-transmitting display layer, which makes it easier to realize a narrow border design at the junction.

DESCRIPTION OF DRAWINGS

In order to illustrate technical solutions of the embodiments or prior art more clearly, drawings used in a description of the embodiments will be briefly described as below. Obviously, the drawings described as below are just some embodiments of the present disclosure. For those of ordinary skill in the art, under a premise of no creative labor, other drawings can also be obtained according to these drawings.

Figure 1:
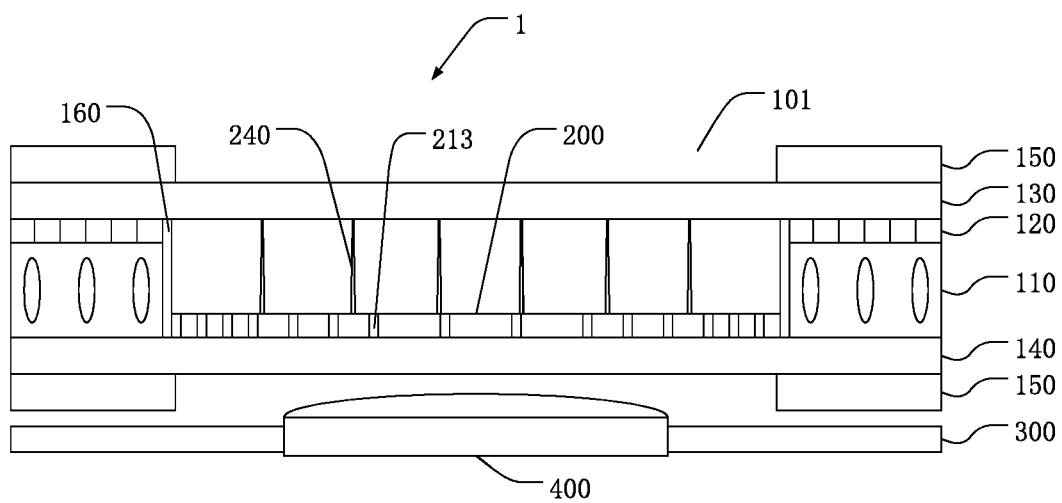
FIG. 1 is a schematic diagram of a layered structure of a display panel in embodiment 1 of the present disclosure.

Elements in the figures are as follows: display panel 1, liquid crystal layer 100, light-transmitting hole 101, second conventional region 102, third transition region 103, fourth transition region 105, liquid crystal layer 110, color resistance layer 120, second pixel 121, second conventional pixel 121A, third transition pixel 121B, fourth transition 121C, second red pixel 121D, second green pixel 121E, second blue pixel 121F, color film substrate 130, array substrate 140, polarizer 150, sealant 160, light-transmitting display layer 200, first conventional region 201, first transition region 202, second transition region 203, first pixel 210, light-emitting region 211, light-transmitting region 212*m*, micro light-emitting diode (micro-LED) chip 213, first conventional pixel 210A, first transition pixel 210B, second transition pixel 210C, first red pixel 210D, first green pixel 210E, first blue pixel 210F, body portion 220, extending portion 230, supporting portion 240, backlight module 300, under-screen sensor 400.

DETAILED DESCRIPTION OF PREFERRED EMBODIMENTS

The following description of every embodiment with reference to the accompanying drawings is used to exemplify a specific embodiment, which may be carried out in the present invention. The embodiments completely introduce the present disclosure for the person having ordinary skill in the art, which makes technology content clear and understand. The present disclosure embodies through different types of the embodiment. The protection range of the present disclosure is not limited in the embodiment of the present disclosure.

In the drawings, components with the same structure are denoted by the same numerals, and components with similar structures or functions are denoted by the similar numerals. Size and thickness of each component shown in the drawings are arbitrarily shown, the present disclosure does not limit the size and thickness of each component. In order to make illustration clearer, some parts of the drawing have exaggerated the thickness of the parts properly.

In addition, the following description of the embodiments of the present disclosure with reference to the appended drawings is used for illustrating specific embodiments which may be used for carrying out the present disclosure. The directional terms described by the present disclosure, such as "upper", "lower", "front", "back", "left", "right", "inner", "outer", "side", etc., are only directions by referring to the accompanying drawings. Thus, the directional terms are used for better and clearer description and understanding of the present disclosure, rather than indicating or implying that devices or elements referred to must have a specific orientation, be constructed and operate in a specific orientation. Therefore, it cannot be understood as a limitation to the present disclosure. In addition, the terms "first", "second", "third", etc. are for descriptive purposes only and cannot be understood as indicating or implying relative importance.

When some components are described as "on" another component, the components may be disposed directly on the other component; and there may also be an intermediate component, the components are disposed on the intermediate component, and the intermediate component is disposed on another component. When a component is described as "mounted to" or "connected to" another component, both can be understood as directly "mounted" or "connected", or one component is indirectly "mounted" or "connected" to another component through an intermediate component.

Embodiment 1

The embodiment of the present disclosure provides a display panel. As shown in FIG. 1, the display panel 1 comprises a liquid crystal display layer 100, a light-emitting display layer 200, a backlight module 300, and an under-screen sensor 400. The liquid crystal display layer 100 comprises a light-transmitting hole 101, and the light-transmitting hole 101 is a through-hole or a blind hole. Preferably, in the embodiment of the present disclosure, the light-transmitting hole 101 is a blind hole. The under-screen sensor 400 is disposed below the liquid crystal display layer 100 and corresponds to the light-transmitting hole 101. The backlight module 300 and the under-screen sensor 400 are disposed on a same side of the liquid crystal display layer 100 and surround the under-screen sensor 400.

The liquid crystal display layer 100 comprises a liquid crystal layer 110, a color resistance layer 120, a color film substrate 130, an array substrate 140, and two layers of polarizers 150. The liquid crystal layer 110 is filled with liquid crystals. The color resistance layer 120 is disposed on a surface of the liquid crystal layer 110, a plurality of second pixels 121 are distributed on thereof, and a size of each second pixel 121 is equal. The array substrate 140 is disposed on a surface of the liquid crystal layer 110 away from the color resistance layer 120. The color film substrate 130 is disposed on a surface of the color resistance layer 120 away from the liquid crystal layer 110. The two layers of polarizers 150 are respectively on the surface of the color film substrate 130 and the array substrate 140 away from the liquid crystal layer 110. Wherein, the liquid crystal layer 110, the color resistance layer 120, and the two layers of polarizers 150 correspond to a through-hole of the light-transmitting hole 101. The liquid crystal display layer 100 further comprises a sealant 160, the sealant is disposed on a hole wall of a through-hole of the liquid crystal layer 110 and surrounds the light-transmitting hole 101, and is configured to encapsulate the liquid crystal layer 110.

The liquid crystals in the liquid crystal layer 110 are special substances between solid and liquid, and are organic compounds that are normally liquid, but their molecular arrangement is very regular like a solid crystal, so they are named liquid crystals. Another special property is that under an action of an electric field, liquid crystal molecules will change in arrangement, thereby affecting change of light passing through them. The change in light can be expressed as a change in light and dark through the polarizer 150. The array substrate 140 is disposed on a surface of the liquid crystal layer 110 and is configured to provide an electric field and control the electric field, thereby controlling an arrangement direction of liquid crystal molecules, changing light transmittance of the liquid crystal layer 110, and finally realizing a purpose of displaying images. Moreover, in conjunction with the color resistance layer 120 and the color film substrate 130, light in the liquid crystal layer 110 is filtered to accurately select light wave in a small range of wave bands to be passed and reflects off other undesired wave bands, allowing the light to show different colors, thereby realizing color image display.

Figure 2:
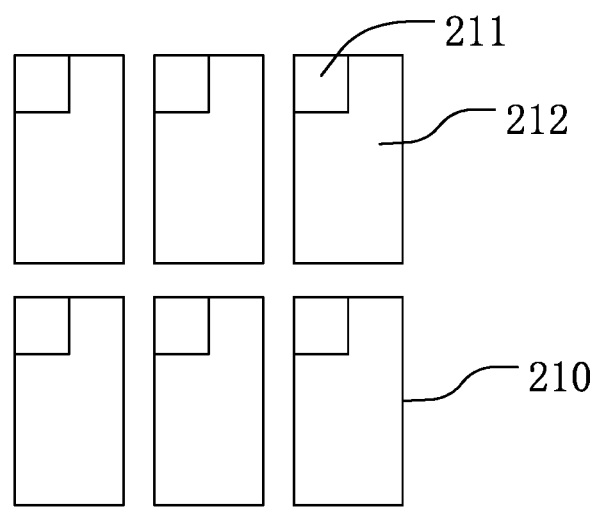
FIG. 2 is a schematic diagram of a planar structure of a first pixel in embodiments 1 to 4 of the present disclosure.

The light-transmitting display layer 200 is disposed on the array substrate 140 in the light-transmitting hole 101 and is located in the through-hole of the liquid crystal layer 110 and the color resistance layer 120. A plurality of first pixels 210 are arranged in the light-transmitting display layer 200. The light-transmitting display layer 200 uses micro light-emitting diode (micro-LED) display technology. As shown in FIG. 2, each of the first pixels 210 comprises a light-emitting region 211 and a light-transmitting region 212 connected to the light-emitting region 211. A micro-LED chip 213 is disposed in the light-emitting region 211, the micro-LED chip 213 is a single-color chip, which can emit one of red light, green light, or blue light. When the light-transmitting display layer 200 needs to display images, the micro-LED chip 213 in the light-emitting region 211 of each of the first pixels 210 realizes a normal display through its self-luminous function, and is connected to a display screen of the liquid crystal display layer 100, thereby realizing full screen display. When the light-transmitting display layer 200 needs to provide a light-transmitting channel for the under-screen sensor 400, the micro-LED chip 213 in the light-emitting region 211 of each of the first pixels 210 does not emit light, and the under-screen sensor 400 performs light collection and imaging through the light-transmitting region 212, thereby realizing under-screen sensing.

Figure 3:
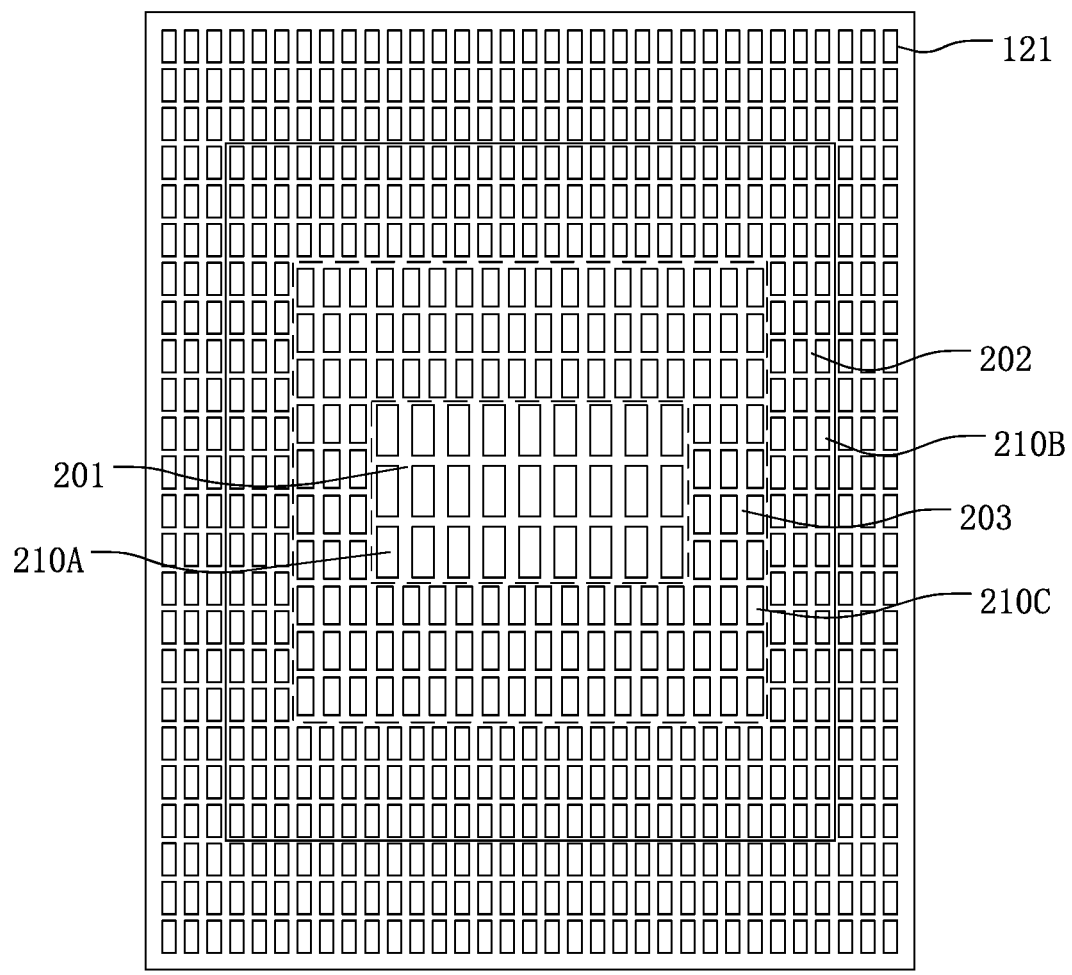
FIG. 3 is a schematic diagram of a pixel distribution of the display panel in the embodiments 1 and 4 of the present disclosure.

As shown in FIG. 3, the light-transmitting display layer 200 further comprises a first conventional region 201, a first transition region 202, and a second transition region 203. The first transition region surrounds the first conventional region 201, and the second transition region 203 is located between the first conventional region 201 and the first transition region 202. The first conventional region 201 is located at a center of the light-transmitting display layer 200, and the first transition region 202 is located at an edge of the light-transmitting display layer 200 close to the liquid crystal display layer 100.

The first pixel 210 comprises a first conventional pixel 210A, a first transition pixel 210B, and a second transition pixel 210C. The first conventional pixel 210A is disposed in the first conventional region 201, the first transition pixel 210B is disposed in the first transition region 202, and the second transition pixel 210C is disposed in the second transition region 203. One to three circles of first transition pixels 210B are arranged in the first transition region 202. Specifically, in the present embodiment, three circles of first transition pixels 210B are arranged in the first transition region 202.

A size of the first transition pixel 210B is less than a size of the first conventional pixel 210A, and is equal to a size of the second pixels 121 in the liquid crystal display layer 100. A size of the second transition pixel 210C is between the sizes of the first conventional pixel 210A and the first transition pixel 210B. Wherein, an area of the light-transmitting region 212 of the first conventional pixel 210A is greater than an area of the light-transmitting region 212 of the first transition pixel 210B, and an area of the light-transmitting region 212 of the second transition pixel 210C is also greater than the area of the light-transmitting region 212 of the first transition pixel 210B. The sizes of the first pixels 210 in the first conventional region 201, the second transition region 203, and the first transition region 202 sequentially decrease according to partitions, and finally reach the same size as the second pixels 121, thereby relieving a difference in display images between the liquid crystal display layer 100 and the light-transmitting display layer 200 due to the pixel sizes, and improving aesthetics of the display images.

In the embodiment of the present disclosure, the light-transmitting display layer 200 comprises a second transition region 203, but in other embodiments of the present disclosure, the light-transmitting display layer 200 may further comprise two or more second transition regions 203, thereby realizing a more delicate pixel size gradation effect. Moreover, a layered structure is similar to the light-transmitting display layer 200 in the embodiment of the present disclosure, which is not described herein. Based on the embodiments in the present disclosure, all other embodiments obtained by those of ordinary skill in the art without making creative efforts fall within a scope of protection of the present disclosure.

The display panel 1 further comprises a supporting layer 240, the supporting layer 240 is disposed between the light-transmitting display layer 200 and the color film substrate 130, and is configured to provide support for the color film substrate 130 to prevent the color film substrate 130 from cracking due to a step difference between the light-transmitting display layer 200 and the liquid crystal display layer 100. A plurality of supporting columns are evenly distributed in the supporting layer 240 or filled with light-transmitting optical glue. Specifically, in the present embodiment, the supporting layer 240 uses the supporting columns.

In the embodiment of the present disclosure, the display panel 1 gradually decreases a size of the first pixels 210 in the light-transmitting display layer 200 according to a distance from the liquid crystal display layer 100 to be equal to the size of the second pixels 121 in the liquid crystal display layer 100, so that the pixel size at a junction of the light-transmitting display layer 200 and the liquid crystal display layer 100 is naturally transitioned, which relieves a difference in the images caused by the inconsistent pixel size, and improves display effect of full screen. Moreover, it is also conducive to splicing of the liquid crystal display layer 100 and the light-transmitting display layer 200, which makes ut easier to realize a narrow border design at the junction.

Embodiment 2

Figure 4:
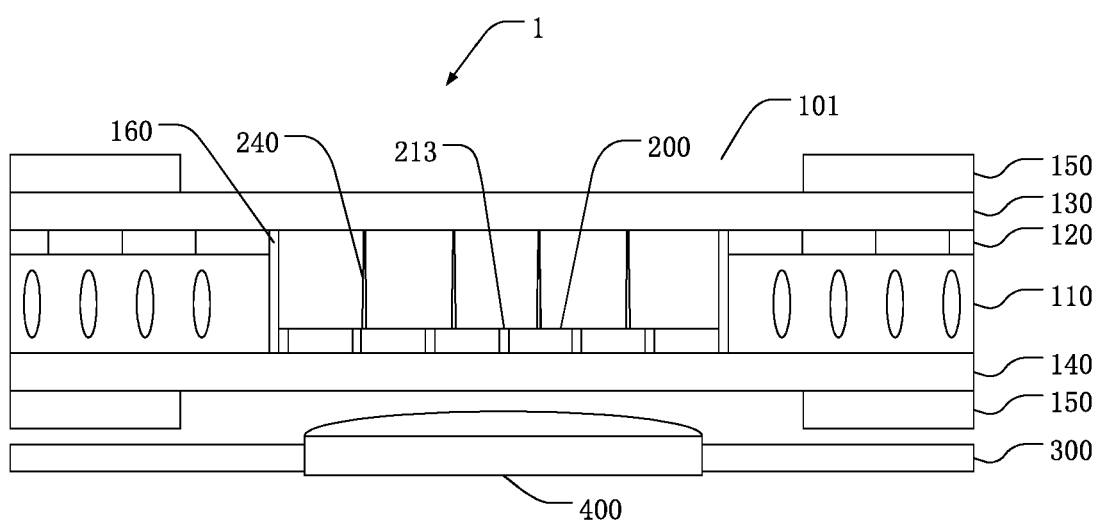
FIG. 4 is a schematic diagram of a layered structure of a display panel in the embodiment 2 of the present disclosure.

The embodiment of the present disclosure provides a display panel 1. As shown in FIG. 4, the display panel 1 comprises a liquid crystal display layer 100, a light-emitting display layer 200, a backlight module 300, and an under-screen sensor 400. The liquid crystal display layer 100 comprises a light-transmitting hole 101, and the light-transmitting hole 101 is a through-hole or a blind hole. Preferably, in the embodiment of the present disclosure, the light-transmitting hole 101 is a blind hole. The under-screen sensor 400 is disposed below the liquid crystal display layer 100 and corresponds to the light-transmitting hole 101. The backlight module 300 and the under-screen sensor 400 are disposed on a same side of the liquid crystal display layer 100 and surround the under-screen sensor 400.

The liquid crystal display layer 100 comprises a liquid crystal layer 110, a color resistance layer 120, a color film substrate 130, an array substrate 140, and two layers of polarizers 150. The liquid crystal layer 110 is filled with liquid crystals. The color resistance layer 120 is disposed on a surface of the liquid crystal layer 110. The array substrate 140 is disposed on a surface of the liquid crystal layer 110 away from the color resistance layer 120. The color film substrate 130 is disposed on a surface of the color resistance layer 120 away from the liquid crystal layer 110. The two layers of polarizers 150 are respectively on the surface of the color film substrate 130 and the array substrate 140 away from the liquid crystal layer 110. Wherein, the liquid crystal layer 110, the color resistance layer 120, and the two layers of polarizers 150 correspond to a through-hole of the light-transmitting hole 101. The liquid crystal display layer 100 further comprises a sealant 160, the sealant is disposed on a hole wall of a through-hole of the liquid crystal layer 110 and surrounds the light-transmitting hole 101, and is configured to encapsulate the liquid crystal layer 110.

The liquid crystals in the liquid crystal layer 110 are special substances between solid and liquid, and are organic compounds that are normally liquid, but their molecular arrangement is very regular like a solid crystal, so they are named liquid crystals. Another special property is that under an action of an electric field, liquid crystal molecules will change in arrangement, thereby affecting change of light passing through them. The change in light can be expressed as a change in light and dark through the polarizer 150. The array substrate 140 is disposed on a surface of the liquid crystal layer 110 and is configured to provide an electric field and control the electric field, thereby controlling an arrangement direction of liquid crystal molecules, changing light transmittance of the liquid crystal layer 110, and finally realizing a purpose of displaying images. Moreover, in conjunction with the color resistance layer 120 and the color film substrate 130, light in the liquid crystal layer 110 is filtered to accurately select light wave in a small range of wave bands to be passed and reflects off other undesired wave bands, allowing the light to show different colors, thereby realizing color image display.

The light-transmitting display layer 200 is disposed on the array substrate 140 in the light-transmitting hole 101 and is located in the through-hole of the liquid crystal layer 110 and the color resistance layer 120. A plurality of first pixels 210 are arranged in the light-transmitting display layer 200. The light-transmitting display layer 200 uses micro-LED display technology. As shown in FIG. 2, each of the first pixels 210 comprises a light-emitting region 211 and a light-transmitting region 212 connected to the light-emitting region 211. A micro-LED chip 213 is disposed in the light-emitting region 211, the micro-LED chip 213 is a single-color chip, which can emit one of red light, green light, or blue light. When the light-transmitting display layer 200 needs to display images, the micro-LED chip 213 in the light-emitting region 211 of each of the first pixels 210 realizes a normal display through its self-luminous function, and is connected to a display screen of the liquid crystal display layer 100, thereby realizing full screen display. When the light-transmitting display layer 200 needs to provide a light-transmitting channel for the under-screen sensor 400, the micro-LED chip 213 in the light-emitting region 211 of each of the first pixels 210 does not emit light, and the under-screen sensor 400 performs light collection and imaging through the light-transmitting region 212, thereby realizing under-screen sensing.

Figure 5:
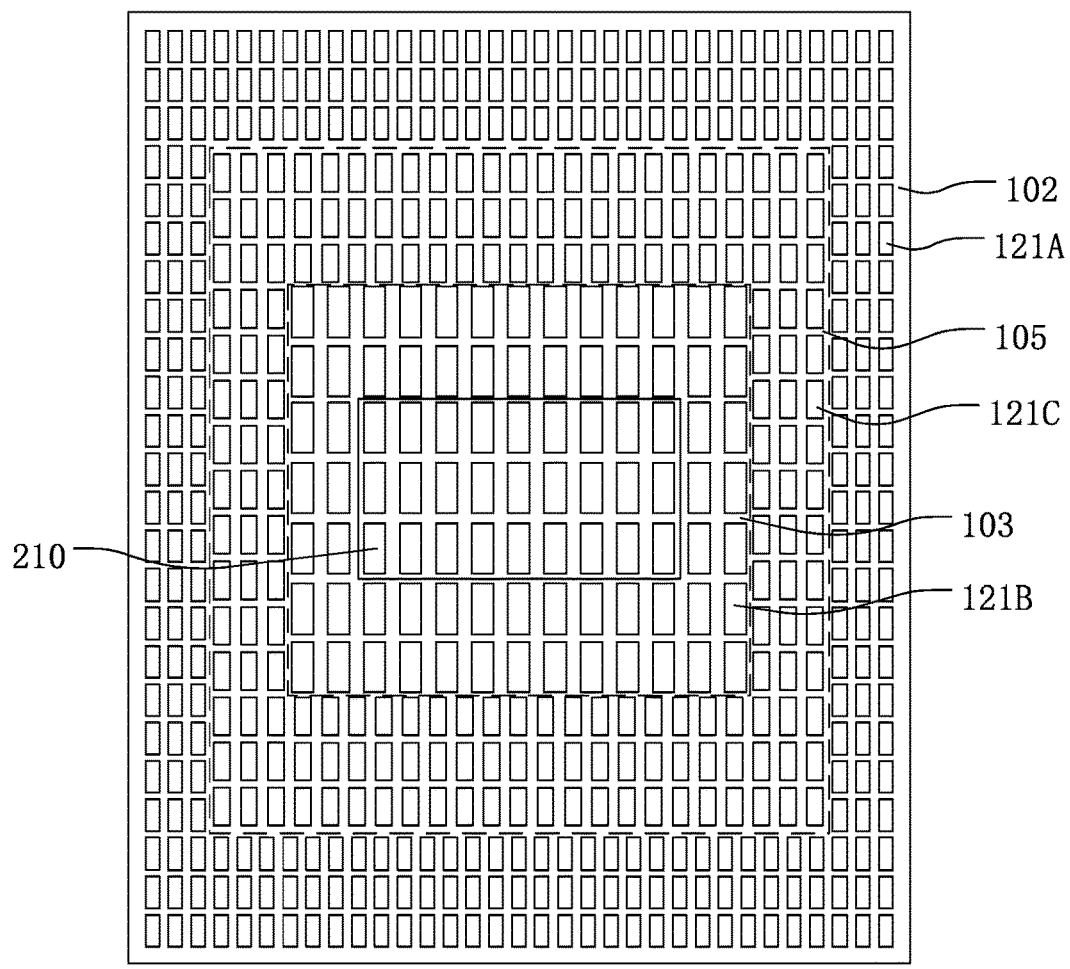
FIG. 5 is a schematic diagram of a pixel distribution of the display panel in the embodiment 2 of the present disclosure.

As shown in FIG. 5, the liquid crystal display layer 100 further comprises a second conventional region 102, a third transition region 103, and a fourth transition region 105. The third transition region surrounds the light-transmitting hole 101, the second conventional region 102 surrounds the third transition region 103, and the fourth transition region is disposed between the second conventional region 102 and the third transition region 103.

A plurality of second pixels 121 are arranged in the color resistance layer 120, and the second pixels 121 comprise a second conventional pixel 121A, a third transition pixel 121B, and a fourth transition pixel 121C. The second conventional pixel 121A is disposed in the second conventional region 102, the third transition pixel 121B is disposed in the third transition region 103, and the fourth transition pixel 121C is disposed in the fourth transition region 105.

A size of the second conventional pixel 121A is less than a size of the third transition pixel 121B, and the size of the third transition pixel 121B is equal to a size of the first pixels 210 in the liquid crystal display layer 100. A size of the fourth transition pixel 121C is between the size of the second conventional pixel 121A and the size of the third transition pixel 121B. The sizes of the second pixels 121 in the second conventional region 102, the third transition region 103, and the fourth transition region 105 sequentially increase according to partitions, and finally reach the same size as the first pixels 210, thereby improving the difference between the display images of the liquid crystal display layer 100 and the light-transmitting display layer 200 due to the pixel sizes, and improving the aesthetics of the display images.

In the embodiment of the present disclosure, the light-transmitting display layer 200 comprises a fourth transition region 105, but in other embodiments of the present disclosure, the light-transmitting display layer 200 may further comprise two or more fourth transition regions 105, thereby realizing a more delicate pixel size gradation effect. Moreover, a layered structure is similar to the liquid crystal display layer 100 in the embodiment of the present disclosure, which is not described herein. Based on the embodiments in the present disclosure, all other embodiments obtained by those of ordinary skill in the art without making creative efforts fall within scope of protection of the present disclosure.

The display panel 1 further comprises a supporting layer 240, the supporting layer 240 is disposed between the light-transmitting display layer 200 and the color film substrate 130, and is configured to provide support for the color film substrate 130 to prevent the color film substrate 130 from cracking due to a step difference of the light-transmitting display layer 200 and the liquid crystal display layer 100. A plurality of supporting columns are evenly distributed in the supporting layer 240 or filled with light-transmitting optical glue. Specifically, in the present embodiment, the supporting layer 240 uses the supporting columns.

In the embodiment of the present disclosure, the display panel 1 gradually increases the size of the second pixels 121 in the liquid crystal display layer 100 according to a distance from the light-transmitting display layer 200 to be equal to the size of the second pixels 121 in the liquid crystal display layer 100, so that the pixel size at the junction of the liquid crystal display layer 100 and the light-transmitting display layer 200 is naturally transitioned, which relieves the difference in the images caused by the inconsistent pixel size, and improves display effect of full screen. Moreover, it is also conducive to the splicing of the liquid crystal display layer 100 and the light-transmitting display layer 200, which makes it easier to realize the narrow border design at the junction.

Embodiment 3

Figure 6:
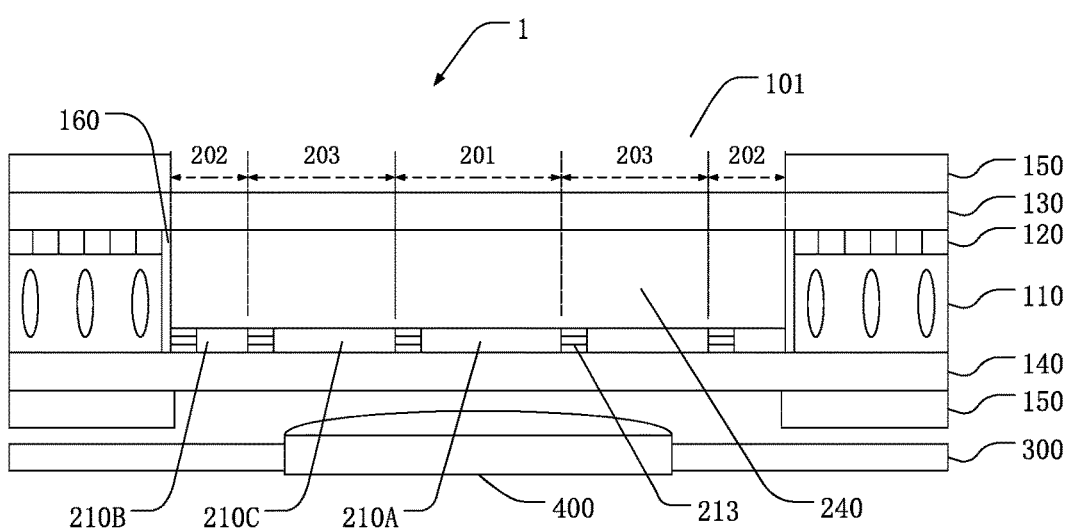
FIG. 6 is a schematic diagram of a layered structure of a display panel in the embodiment 3 of the present disclosure.

The embodiment of the present disclosure provides a display panel 1. As shown in FIG. 6, the display panel 1 comprises a liquid crystal display layer 100, a light-emitting display layer 200, a backlight module 300, and an under-screen sensor 400. The liquid crystal display layer 100 comprises a light-transmitting hole 101, and the light-transmitting hole 101 is a through-hole or a blind hole. Preferably, in the embodiment of the present disclosure, the light-transmitting hole 101 is a blind hole. The under-screen sensor 400 is disposed below the liquid crystal display layer 100 and corresponds to the light-transmitting hole 101. The backlight module 300 and the under-screen sensor 400 are disposed on a same side of the liquid crystal display layer 100 and surround the under-screen sensor 400.

The liquid crystal display layer 100 comprises a liquid crystal layer 110, a color resistance layer 120, a color film substrate 130, an array substrate 140, and two layers of polarizers 150. The liquid crystal layer 110 is filled with liquid crystals. The color resistance layer 120 is disposed on a surface of the liquid crystal layer 110, a plurality of second pixels 121 are distributed on thereof, and a size of each second pixel 121 is equal. The second pixels 121 comprise a plurality of second red pixels 121D, a plurality of second green pixels 121E, and a plurality of second blue pixels 121F, and the second red pixel 121D, the second green pixel 121E, and the second blue pixel 121F are sequentially arranged in the color resistance layer 120. The array substrate 140 is disposed on a surface of the liquid crystal layer 110 away from the color resistance layer 120. The color film substrate 130 is disposed on a surface of the color resistance layer 120 away from the liquid crystal layer 110. The two layers of polarizers 150 are respectively on the surface of the color film substrate 130 and the array substrate 140 away from the liquid crystal layer 110. Wherein, the liquid crystal layer 110, the color resistance layer 120, and the two layers of polarizers 150 correspond to a through-hole of the light-transmitting hole 101. The liquid crystal display layer 100 further comprises a sealant 160, the sealant is disposed on a hole wall of a through-hole of the liquid crystal layer 110 and surrounds the light-transmitting hole 101, and is configured to encapsulate the liquid crystal layer 110.

The liquid crystals in the liquid crystal layer 110 are special substances between solid and liquid, and are organic compounds that are normally liquid, but their molecular arrangement is very regular like a solid crystal, so they are named liquid crystals. Another special property is that under an action of an electric field, liquid crystal molecules will change in arrangement, thereby affecting change of light passing through them. The change in light can be expressed as a change in light and dark through the polarizer 150. The array substrate 140 is disposed on a surface of the liquid crystal layer 110 and is configured to provide an electric field and control the electric field, thereby controlling an arrangement direction of liquid crystal molecules, changing light transmittance of the liquid crystal layer 110, and finally realizing a purpose of displaying images. Moreover, in conjunction with the color resistance layer 120 and the color film substrate 130, light in the liquid crystal layer 110 is filtered to accurately select light wave in a small range of wave bands to be passed and reflects off other undesired wave bands, allowing the light to show different colors, thereby realizing color image display.

The light-transmitting display layer 200 is disposed on the array substrate 140 in the light-transmitting hole 101 and is located in the through-hole of the liquid crystal layer 110 and the color resistance layer 120. A plurality of first pixels 210 are arranged in the light-transmitting display layer 200. The light-transmitting display layer 200 uses micro-LED display technology. As shown in FIG. 2, each of the first pixels 210 comprises a light-emitting region 211 and a light-transmitting region 212 connected to the light-emitting region 211. A micro-LED chip 213 is disposed in the light-emitting region 211, the micro-LED chip 213 is a tri-color chip controlled by timing, and only a single chip can respectively emit light of three colors of red, green, and blue, thereby realizing color display. When the light-transmitting display layer 200 needs to display images, the micro-LED chip 213 in the light-emitting region 211 of each of the first pixels 210 realizes a normal display through its self-luminous function, and is connected to a display screen of the liquid crystal display layer 100, thereby realizing full screen display. When the light-transmitting display layer 200 needs to provide a light-transmitting channel for the under-screen sensor 400, the micro-LED chip 213 in the light-emitting region 211 of each of the first pixels 210 does not emit light, and the under-screen sensor 400 performs light collection and imaging through the light-transmitting region 212, thereby realizing under-screen sensing.

The light-transmitting display layer 200 further comprises a first conventional region 201, a first transition region 202, and a second transition region 203. The first transition region surrounds the first conventional region 201, and the second transition region 203 is located between the first conventional region 201 and the first transition region 202. The first conventional region 201 is located at a center of the light-transmitting display layer 200, and the first transition region 202 is located at an edge of the light-transmitting display layer 200 close to the liquid crystal display layer 100.

The first pixel 210 comprises a first conventional pixel 210A, a first transition pixel 210B, and a second transition pixel 210C. The first conventional pixel 210A is disposed in the first conventional region 201, the first transition pixel 210B is disposed in the first transition region 202, and the second transition pixel 210C is disposed in the second transition region 203. Moreover, a circle of second transition pixels 210C is also arranged in the second transition region 203. Wherein, both the first transition region 202 and the second transition region 203 are ring-shaped, a ring width of the first transition region 202 is equal to a width of the first transition pixel 210G, and a ring width of the second transition region 203 is equal to a width of the second transition pixel 210C.

A size of the first transition pixel 210B is less than the size of the first conventional pixel 210A, and the width of the first transition pixel 210B is equal to a sum of widths of the second red pixel 121D, the second green pixel 121E, and the second blue pixel 121F in the liquid crystal display layer 100. Wherein, an area of the light-transmitting region 212 of the first conventional pixel 210A is greater than an area of the light-transmitting region 212 of the first transition pixel 210B, and an area of the light-transmitting region 212 of the second transition pixel 210C is also greater than the area of the light-transmitting region 212 of the first transition pixel 210B. The sizes of the first pixels 210 in the first conventional region 201, the second transition region 203, and the first transition region 202 sequentially decrease according to partitions, and finally reach an effect that the pixel size at the junction is close to a sum of the sizes of the tri-color pixels in the liquid crystal display layer 100, thereby improving the difference in display images between the liquid crystal display layer 100 and the light-transmitting display layer 200 due to the pixel sizes, and improving the aesthetics of the display images.

In the embodiment of the present disclosure, the light-transmitting display layer 200 comprises a second transition region 203, but in other embodiments of the present disclosure, the light-transmitting display layer 200 may further comprise two or more second transition regions 203, thereby realizing a more delicate pixel size gradation effect. Moreover, a layered structure is similar to the light-transmitting display layer 200 in the embodiment of the present disclosure, which is not described herein. Based on the embodiments in the present disclosure, all other embodiments obtained by those of ordinary skill in the art without making creative efforts fall within the scope of protection of the present disclosure.

The display panel 1 further comprises a supporting layer 240, the supporting layer 240 is disposed between the light-transmitting display layer 200 and the color film substrate 130, and is configured to provide support for the color film substrate 130 to prevent the color film substrate 130 from cracking due to a step difference between the light-transmitting display layer 200 and the liquid crystal display layer 100. A plurality of supporting columns are evenly distributed in the supporting layer 240 or filled with light-transmitting optical glue. Specifically, in the present embodiment, the supporting layer 240 uses the supporting columns.

In the embodiment of the present disclosure, the display panel 1 gradually decreases a size of the first pixels 210 in the light-transmitting display layer 200 according to the distance from the liquid crystal display layer 100 to be close to the sum of the sizes of the second pixels 121 of the tri-color pixels in the liquid crystal display layer 100, so that the pixel size at the junction of the light-transmitting display layer 200 and the liquid crystal display layer 100 is naturally transitioned, which relieves the difference in the images caused by the inconsistent pixel size, and improves display effect of full screen. Moreover, it is also conducive to splicing of the liquid crystal display layer 100 and the light-transmitting display layer 200, which makes it easier to realize a narrow border design at the junction. Compared with the embodiment 1 and the embodiment 2, the light-transmitting display layer 200 uses the tri-color chip, so that an entire area of the light-emitting region 211 is smaller and an entire area of the light-transmitting region 212 is bigger, which has a better light-transmitting effect.

Embodiment 4

Figure 7:
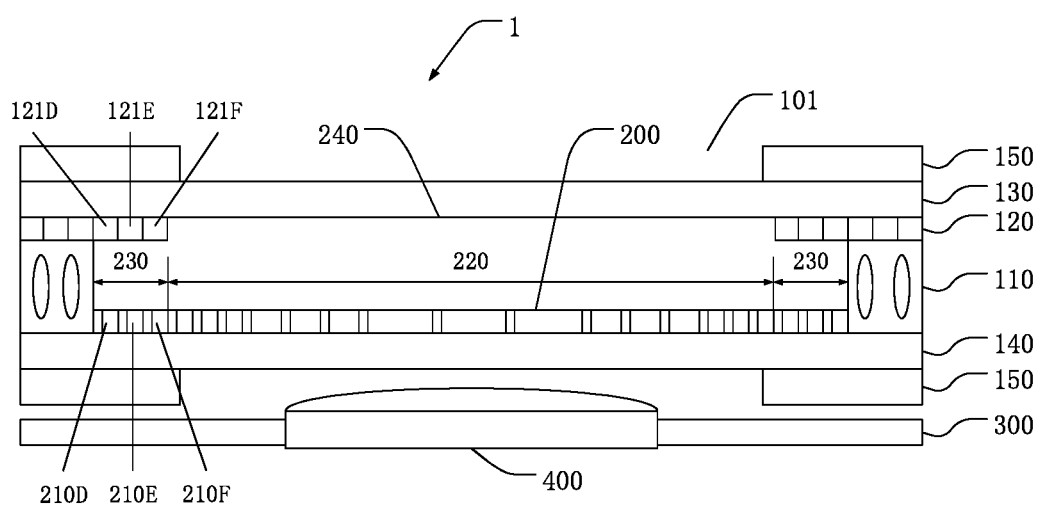
FIG. 7 is a schematic diagram of a layered structure of a display panel in the embodiment 4 of the present disclosure.

The embodiment of the present disclosure provides a display panel 1. As shown in FIG. 7, the display panel 1 comprises a liquid crystal display layer 100, a light-emitting display layer 200, a backlight module 300, and an under-screen sensor 400. The liquid crystal display layer 100 comprises a light-transmitting hole 101, and the light-transmitting hole 101 is a through-hole or a blind hole. Preferably, in the embodiment of the present disclosure, the light-transmitting hole 101 is a blind hole. The under-screen sensor 400 is disposed below the liquid crystal display layer 100 and corresponds to the light-transmitting hole 101. The backlight module 300 and the under-screen sensor 400 are disposed on a same side of the liquid crystal display layer 100 and surround the under-screen sensor 400.

The liquid crystal display layer 100 comprises a liquid crystal layer 110, a color resistance layer 120, a color film substrate 130, an array substrate 140, and two layers of polarizers 150. The liquid crystal layer 110 is filled with liquid crystals. The color resistance layer 120 is disposed on a surface of the liquid crystal layer 110, a plurality of second pixels 121 are distributed on thereof, and a size of each second pixel 121 is equal. The second pixels 121 comprise a plurality of second red pixels 121D, a plurality of second green pixels 121E, and a plurality of second blue pixels 121F, and the second red pixel 121D, the second green pixel 121E, and the second blue pixel 121F are sequentially arranged in the color resistance layer 120. The array substrate 140 is disposed on a surface of the liquid crystal layer 110 away from the color resistance layer 120. The color film substrate 130 is disposed on a surface of the color resistance layer 120 away from the liquid crystal layer 110. The two layers of polarizers 150 are respectively on the surface of the color film substrate 130 and the array substrate 140 away from the liquid crystal layer 110. Wherein, the liquid crystal layer 110, the color resistance layer 120, and the two layers of polarizers 150 correspond to a through-hole of the light-transmitting hole 101. The liquid crystal display layer 100 further comprises a sealant 160, the sealant is disposed on a hole wall of a through-hole of the liquid crystal layer 110 and surrounds the light-transmitting hole 101, and is configured to encapsulate the liquid crystal layer 110.

The liquid crystals in the liquid crystal layer 110 are special substances between solid and liquid, and are organic compounds that are normally liquid, but their molecular arrangement is very regular like a solid crystal, so they are named liquid crystals. Another special property is that under an action of an electric field, liquid crystal molecules will change in arrangement, thereby affecting change of light passing through them. The change in light can be expressed as a change in light and dark through the polarizer 150. The array substrate 140 is disposed on a surface of the liquid crystal layer 110 and is configured to provide an electric field and control the electric field, thereby controlling an arrangement direction of liquid crystal molecules, changing light transmittance of the liquid crystal layer 110, and finally realizing a purpose of displaying images. Moreover, in conjunction with the color resistance layer 120 and the color film substrate 130, light in the liquid crystal layer 110 is filtered to accurately select light wave in a small range of wave bands to be passed and reflects off other undesired wave bands, allowing the light to show different colors, thereby realizing color image display.

The light-transmitting display layer 200 is disposed on the array substrate 140 in the light-transmitting hole 101 and is located in the through-hole of the liquid crystal layer 110 and the color resistance layer 120. A plurality of first pixels 210 are arranged in the light-transmitting display layer 200. The light-transmitting display layer 200 uses micro-LED display technology. As shown in FIG. 2, each of the first pixels 210 comprises a light-emitting region 211 and a light-transmitting region 212 connected to the light-emitting region 211. A micro-LED chip 213 is disposed in the light-emitting region 211, the micro-LED chip 213 is a single-color chip, which can emit one of red light, green light, or blue light. When the light-transmitting display layer 200 needs to display images, the micro-LED chip 213 in the light-emitting region 211 of each of the first pixels 210 realizes a normal display through its self-luminous function, and is connected to a display screen of the liquid crystal display layer 100, thereby realizing full screen display. When the light-transmitting display layer 200 needs to provide a light-transmitting channel for the under-screen sensor 400, the micro-LED chip 213 in the light-emitting region 211 of each of the first pixels 210 does not emit light, and the under-screen sensor 400 performs light collection and imaging through the light-transmitting region 212, thereby realizing under-screen sensing.

The light-transmitting display layer 200 has a body portion 220 and an extending portion 230, and the body portion 220 corresponds to the light-transmitting hole 101. As shown in FIG. 3, the body portion 220 comprises a first conventional region 201, a first transition region 202, and a second transition region 203. The first transition region surrounds the first conventional region 201, and the second transition region 203 is located between the first conventional region 201 and the first transition region 202. The first conventional region 201 is located at a center of the body portion 220, and the first transition region 202 is located at an edge of the body portion 220 close to the liquid crystal display layer 100. The extending portion 230 surrounds the body portion 220 and is derived from the light-transmitting hole 101 into the liquid crystal display layer 100 between the color resistance layer 120 and the array substrate 140, and the liquid crystal layer 110 surrounds a side of the extending portion 230.

The first pixel 210 can be divided into a first conventional pixel 210A, a first transition pixel 210B, and a second transition pixel 210C according to sizes. The first conventional pixel 210A is disposed in the first conventional region 201 and the extending portion 230, the first transition pixel 210B is disposed in the first transition region 202, and the second transition pixel 210C is disposed in the second transition region 203. One to three circles of first transition pixels 210B arranged in the first transition region 202 and the extending portion 230. Specifically, in the present embodiment, three circles of first transition pixels 210B arranged in the first transition region 202 and the extending portion 230. In the first transition region 202 or the extending portion 230, a light-emitting color of the first transition pixel 210B of each circle is different. Wherein, the first pixel 210 can be divided into a first red pixel 210D, a first green pixel 210E, and a first blue pixel 210F according to the light-emitting color, and the first red pixel 210D, the first green pixel 210E, and the first blue pixel 210F are sequentially arranged in the light-transmitting display layer 200. Moreover, as shown in FIG. 7, in the extending portion 230, the first red pixel 210D corresponds to the second red pixel 121D, the first green pixel 210E corresponds to the second green pixel 121E, and the first blue pixel 210F corresponds to the second blue pixel 121F. The color of the first pixel 210 in the extending portion 230 corresponds to the color of the second pixel 121 in the color resistance layer 120. When the panel assembly is shifted, the color resistance layer 120 can also function as a light filter to absorb a scattering problem of adjacent colors due to the assembly shift, thereby improving the display images.

A size of the first transition pixel 210B is less than a size of the first conventional pixel 210A, and is equal to a size of the second pixels 121 in the liquid crystal display layer 100. A size of the second transition pixel 210C is between the sizes of the first conventional pixel 210A and the first transition pixel 210B. Wherein, an area of the light-transmitting region 212 of the first conventional pixel 210A is greater than an area of the light-transmitting region 212 of the first transition pixel 210B, and an area of the light-transmitting region 212 of the second transition pixel 210C is also greater than the area of the light-transmitting region 212 of the first transition pixel 210B. The sizes of the first pixels 210 in the first conventional region 201, the second transition region 203, and the first transition region 202 sequentially decrease according to partitions, and finally reach the same size as the second pixels 121, thereby relieving a difference in display images between the liquid crystal display layer 100 and the light-transmitting display layer 200 due to the pixel sizes, and improving the aesthetics of the display images In the embodiment of the present disclosure, the light-transmitting display layer 200 comprises a second transition region 203, but in other embodiments of the present disclosure, the light-transmitting display layer 200 may further comprise two or more second transition regions 203, thereby realizing a more delicate pixel size gradation effect. Moreover, a layered structure is similar to the light-transmitting display layer 200 in the embodiment of the present disclosure, which is not described herein. Based on the embodiments in the present disclosure, all other embodiments obtained by those of ordinary skill in the art without making creative efforts fall within the scope of protection of the present disclosure.

The display panel 1 further comprises a supporting layer 240, the supporting layer 240 is disposed between the light-transmitting display layer 200 and the color film substrate 130, and extends between the extending portion 230 of the light-transmitting display layer 200 and the color resistance layer 120 of the liquid crystal display layer 100. The liquid crystal layer 110 surrounds the supporting layer 240 and a side of the extending portion 230 of the light-transmitting display layer 200 at the same time. The supporting layer 240 is configured to provide support for the color film substrate 130 to prevent the color film substrate 130 from cracking due to a step difference between the light-transmitting display layer 200 and the liquid crystal display layer 100. A plurality of supporting columns are evenly distributed in the supporting layer 240 or filled with light-transmitting optical glue. Specifically, in the present embodiment, the supporting layer 240 uses the supporting columns.

In the embodiment of the present disclosure, the display panel 1 gradually decreases a size of the first pixels 210 in the light-transmitting display layer 200 according to a distance from the liquid crystal display layer 100 to be equal to the size of the second pixels 121 in the liquid crystal display layer 100, so that the pixel size at a junction of the light-transmitting display layer 200 and the liquid crystal display layer 100 is naturally transitioned, which relieves the difference in the images caused by the inconsistent pixel size, and improves display effect of full screen. Moreover, it is also conducive to the splicing of the liquid crystal display layer 100 and the light-transmitting display layer 200, which makes it easier to realize a narrow border design at the junction. Compared with the embodiment 1 and the embodiment 2, and the embodiment 3, the light-transmitting display layer 200 in the embodiment of the present disclosure extends into the inner liquid crystal display layer 100, which reduces difficulty of assembly, improves uneven display caused by assembly deviation, and borders of the junction can be narrower.

Although the present disclosure has been described with reference to specific embodiments herein, it should be understood that the embodiments are merely examples of principles and applications of the present disclosure. Therefore, it should be understood that many modifications can be made to the exemplary embodiments and that other arrangements can be devised as long as it does not depart from a spirit and a scope of the present disclosure as defined by the appended claims. It should be understood that different dependent claims and features described herein can be combined in ways other than those described in original claims. Furthermore, the features described in conjunction with individual embodiments can be used in other described embodiments.

What is claimed is:

1. A display panel, comprising:
    a liquid crystal display layer comprising a light-transmitting hole; and
    a light-transmitting display layer disposed in the light-transmitting hole;
    wherein a plurality of first pixels are distributed in the light-transmitting display layer, and a plurality of second pixels are distributed in the liquid crystal display layer;
    a size of the first pixels close to the liquid crystal display layer is less than a size of the first pixels away from the liquid crystal display layer; and/or
    a size of the second pixels away from the light-transmitting display layer is less than a size of the second pixels close to the light-transmitting display layer.

2. The display panel as claimed in claim 1, wherein when the size of the first pixels close to the liquid crystal display layer is less than the size of the first pixels away from the liquid crystal display layer, the light-transmitting display layer comprises a first conventional region and a first transition region surrounding the first conventional region; and
    the first pixels comprise:
    a first conventional pixel disposed in the first conventional region; and
    a first transition pixel disposed in the first transition region, wherein a size of the first transition pixel is less than a size of the first conventional pixel.

3. The display panel as claimed in claim 2, wherein the light-transmitting display layer comprises at least one second transition region located between the first transition pixel and the first conventional region; and
    the first pixels comprise:
    a second transition pixel disposed in the second transition region, wherein a size of the second transition pixel is greater than the size of the first transition pixel and less than the size of the first conventional pixel.

4. The display panel as claimed in claim 1, wherein when the size of the second pixels away from the light-transmitting display layer is less than the size of the second pixels close to the light-transmitting display layer, the liquid crystal display layer comprises a third transition region and a second conventional region surrounding the third transition region; and
    the second pixels comprise:
    a second conventional pixel disposed in the second conventional region; and
    a third transition pixel disposed in the third transition region, wherein a size of the third transition pixel is greater than a size of the second conventional pixel and equal to that the size of the first pixels.

5. The display panel as claimed in claim 4, wherein the liquid crystal display layer comprises at least one fourth transition region located between the third transition region and the second conventional region; and
    the second pixels comprise:
    a fourth transition pixel disposed in the fourth transition region, wherein a size of the fourth transition pixel is greater than the size of the second conventional pixel and less than the size of the third transition pixel.

6. The display panel as claimed in claim 1, wherein the light-transmitting display layer comprises a body portion and an extending portion surrounding the body portion, and the extending portion extends from the light-transmitting hole into the liquid crystal display layer; and
    in the extending portion, the size of the first pixels is equal to the size of the second pixels.

7. The display panel as claimed in claim 6, wherein the first pixels comprise first red pixels, first green pixels, and first blue pixels that are sequentially arranged in the light-transmitting display layer; and
    the second pixels comprise second red pixels, second green pixels, and second blue pixels that are sequentially arranged in the liquid crystal display layer;
    wherein in the extending portion, the first red pixel corresponds to the second red pixel, the first green pixel corresponds to the second green pixel, and the first blue pixel corresponds to the second blue pixel.

8. The display panel as claimed in claim 1, wherein the display panel comprises a supporting layer disposed on the light-transmitting display layer.

9. The display panel as claimed in claim 1, wherein each of the first pixels comprises a light-emitting region and a light-transmitting region connected to the light-emitting region; and
    the light-emitting region comprises at least one micro light-emitting diode (micro-LED) chip.

10. The display panel as claimed in claim 9, wherein the micro-LED chip is one of a single-color chip or a tri-color chip.

* * * * *